United States Patent
Takashima (10) Patent No.: US 7,023,778 B2
(45) Date of Patent: Apr. 4, 2006

(54) PLAYBACK APPARATUS AND POWER-SAVING METHOD

(75) Inventor: Kazuhiro Takashima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 391 days.

(21) Appl. No.: 10/378,969

(22) Filed: Mar. 5, 2003

(65) Prior Publication Data

US 2003/0179672 A1 Sep. 25, 2003

(30) Foreign Application Priority Data

Mar. 22, 2002 (JP) ............................ 2002-081917

(51) Int. Cl.
*G11B 7/00* (2006.01)
(52) U.S. Cl. .................................. 369/53.18
(58) Field of Classification Search .............. 369/53.18
See application file for complete search history.

(56) References Cited

U.S. PATENT DOCUMENTS

| 4,766,580 | A | * | 8/1988 | Go et al. ...................... 369/21 |
| 6,108,426 | A | * | 8/2000 | Stortz ........................... 381/77 |
| 6,294,895 | B1 | * | 9/2001 | Kukai ........................... 320/132 |
| 6,385,149 | B1 | * | 5/2002 | Sekii ........................... 369/47.15 |
| 2001/0013983 | A1 | * | 8/2001 | Izawa et al. ................... 360/2 |

FOREIGN PATENT DOCUMENTS

| JP | 7-65507 | 3/1995 |
| JP | 2001333368 | 11/2001 |

OTHER PUBLICATIONS

Copy of Notification of the Reasons for Rejection in Japanese Patent Application No. 2002-081917 dated Feb. 5, 2004 on which the instant application relies on for priority

* cited by examiner

Primary Examiner—A. L. Wellington
Assistant Examiner—Lixi Chow
(74) Attorney, Agent, or Firm—Pillsbury Winthrop Shaw Pittman LLP (57) ABSTRACT

In a playback apparatus which plays back music in a plurality of audio formats, a control unit detects a voltage level of a power supply unit and restricts a playback of music in one of the audio formats, which requires power consumption whose amount exceeds a given value, when the detected voltage level is lower than a threshold value. Alternatively, the control unit restricts a playback of one of a plurality of pieces of music, which requires power whose amount exceeds a given value, when the detected voltage level is lower than a threshold value.

10 Claims, 6 Drawing Sheets

Correspondence table between audio format and power consumption

| Audio format | Power consumption |
|---|---|
| A | D |
| B | E |
| C | F |

FIG. 4 (D>E>F)

Correspondence table between threshold value of battery voltage and that of power consumption

| Threshold value of battery voltage | Corresponding power consumption |
|---|---|
| X | Z |
| Y | W |

FIG. 5 (X>Y, Z>W)

Correspondence table between music, playing time and amount of power

| Music No. | Playing time | Amount of power |
|---|---|---|
| 1 | 5' 15" | b |
| 2 | 3' 23" | h |
| 3 | 3' 59" | f |
| 4 | 1' 40" | j |
| 5 | 6' 0" | a |
| 6 | 4' 28" | e |
| 7 | 4' 33" | d |
| 8 | 4' 34" | c |
| 9 | 3' 39" | g |
| 10 | 2' 55" | i |
| ⋮ | ⋮ | ⋮ |

Correspondence table between threshold value of battery voltage and that of power consumption

| Threshold value of battery voltage | Corresponding power consumption |
|---|---|
| P | R |
| Q | S |

PLAYBACK APPARATUS AND POWER-SAVING METHOD

CROSS-REFERENCE TO RELATED APPLICATIONS

This application is based upon and claims the benefit of priority from the prior Japanese Patent Application No. 2002-081917, filed Mar. 22, 2002, the entire contents of which are incorporated herein by reference.

BACKGROUND OF THE INVENTION

1. Field of the Invention

The present invention relates to a playback apparatus for playing back music and a power-saving method.

2. Description of the Related Art

Audio players that record digital audio data on a solid-state memory, a disk, etc. and play back the data have been used widely in recent years. The digital audio data is compressed by digital data compression technology. For example, all songs of one CD can be stored in a flash memory card whose storage capacity is much smaller than that of the CD, and data of a plurality of CDs can be compressed and stored in a CD-R and reproduced therefrom.

Players using a flash memory card include a portable player having a slot that is adaptable to an SD card, Smartmedia, compact flash and the like. Players using a CD-R include a portable player having both a CD player function and a playback function such as MP3 and WMA and a DVD player having an MP3 playback function.

Some audio players are adaptable to a variety of audio formats. They are able to select and reproduce any music that is stored in the audio formats.

However, some audio players require a large amount of power consumption in decoding music data (including decompressing music data) according to the type of audio format. If a battery-powered portable player plays back music without taking consideration a difference in power consumption between different audio formats, a battery will be exhausted at once. If, in particular, music that is stored in audio format requiring a large amount of power consumption is played back with a small amount of remaining charge of a battery, the battery will be exhausted in a very short time.

In order to resolve the above problem, a technique to prevent a battery from being exhausted quickly and lengthen playing time while the remaining amount of charge of the battery is small is desired.

Jpn. Pat. Appln. KOKAI Publication No. 7-065507 discloses a technique to lengthen the lifetime of a battery in a portable disk playback apparatus. However, this technique aims at lengthening the lifetime of a battery used as a driving power supply by stopping a servo control operation during the stoppage of readout of data from a recording medium and does not refer to the problem of battery exhaustion due to an audio format requiring a large amount of power consumption.

BRIEF SUMMARY OF THE INVENTION

Embodiments of the present invention provide a playback apparatus capable of preventing a battery from being exhausted quickly and acquiring a longer playing time.

According to one aspect of the present invention, there is provided a playback apparatus which plays back music in a plurality of audio formats, the apparatus comprising a voltage level detecting unit configured to is detect a voltage level of a battery; and a control unit configured to restrict a playback of music in, one of the plurality of audio formats, which requires power consumption whose amount exceeds a given value, when the voltage level detected by the voltage level detecting unit is lower than a threshold value.

According to another aspect of the present invention, there is provided a playback apparatus which plays back a plurality of pieces of music, the apparatus comprising a voltage level detecting unit configured to detect a voltage level of a battery; and a control unit configured to restrict a playback of one of the plurality of pieces of music, which requires power whose amount exceeds a given value, when the voltage level detected by the voltage level detecting unit is lower than a threshold value.

According to still another aspect of the present invention, there is provided a power-saving method applied to a playback apparatus which plays back music in a plurality of audio formats, the method comprising detecting a voltage level of a battery; and restricting a playback of music in one of the plurality of audio formats, which requires power consumption whose amount exceeds a given value, when the detected voltage level is lower than a threshold value.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will now be described with reference to the accompanying drawings.

Figure 1:
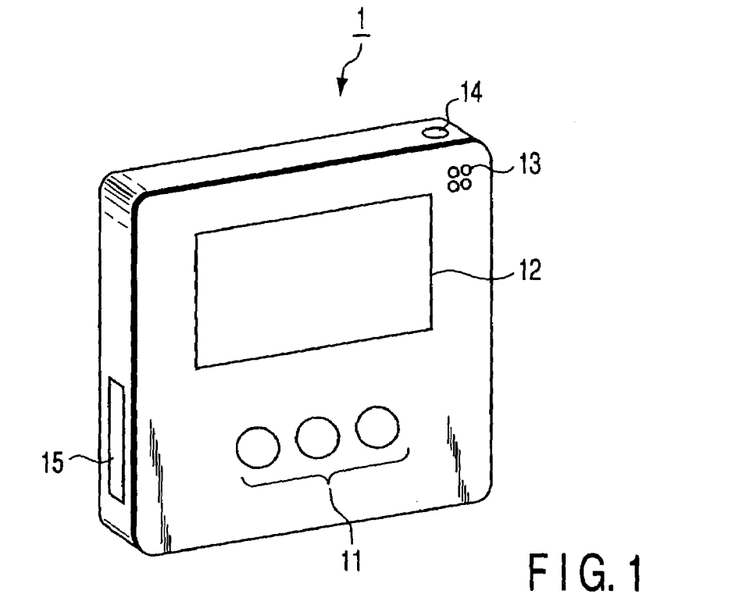
FIG. 1 is an external view of a music playback apparatus according to first and second embodiments of the present invention.

FIG. 1 is an external view of a music playback apparatus according to the first and second embodiments of the present invention.

A music playback apparatus 1 is, for example, a portable player and adaptable to different audio formats such as MP3, WMA and AAC. The music playback apparatus 1 is capable of playing back a plurality of pieces of music in sequence. The apparatus 1 includes an operating unit 11, a display unit 12, a speaker 13, a headphone terminal 14 and a slot 15.

The operating unit 11 includes operating buttons to play back, stop, make a pause for, fast-forward and reverse a piece of music.

The display unit 12 is a display to display information about music to be played back.

The speaker 13 notifies a user of a given alert by voice when the user performs an inadequate input operation.

The headphone terminal 14 is a terminal to which a headphone is electrically connected in order to listen to music to be played back.

The slot 15 is a slot into/from which a memory card storing music data can be inserted/removed. When a memory card is inserted into the slot 15, music data is stored in a recording medium included in the apparatus.

Figure 2:
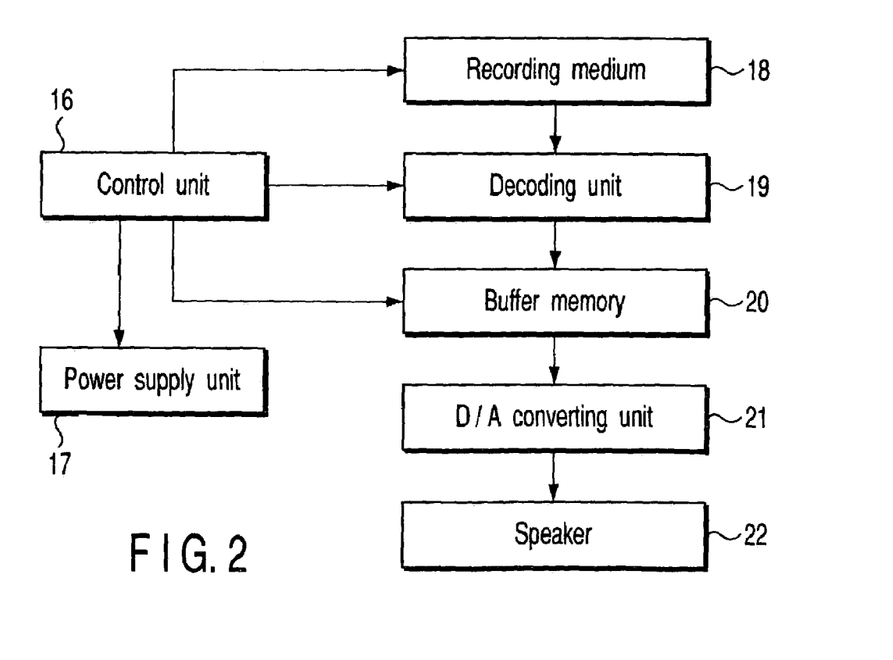
FIG. 2 is a block diagram showing an internal structure of the music playback apparatus according to first and second embodiments of the present invention.

FIG. 2 is a block diagram showing an internal structure of the music playback apparatus according to the first and second embodiments of the present invention.

The music playback apparatus 1 also includes a control unit 16, a power supply unit (battery) 17, a recording medium 18, a decoding unit 19, a buffer memory 20, a D/A (digital/analog) converting unit 21 and a speaker 22.

The control unit 16 controls the whole of the music playback apparatus 1. For example, the control unit 16 performs processes of reading music data out of the recording medium 18, decoding music data in the decoding unit 19, storing music data temporarily in the buffer memory 20 and transferring the data.

In particular, the control unit 16 (in the first embodiment) has a function of detecting a voltage level of the power supply unit (battery) 17 and restricting a playback of music in audio format requiring power consumption the amount of which exceeds a given value when the detected voltage level is lower than a threshold value. For example, the control unit 16 fulfills a function of inhibiting a playback of music in the audio format or playing back only the beginning of music in the audio format.

The control unit 16 (in the second embodiment) has a function of detecting a voltage level of the power supply unit (battery) 17 and restricting a playback of music requiring power whose amount exceeds a given value when the detected voltage level is lower than a threshold value. For example, the control unit 16 fulfills a function of inhibiting a playback of the music or playing back only the beginning of the music.

The power supply unit 17 includes a battery that stores power. The unit 17 supplies power to the respective units of the music playback apparatus 1.

The recording medium 18 corresponds to a flash memory card, a CD-R and the like. The medium 18 stores music data (audio data) and control information associated with the music data.

The decoding unit 19 decodes music data read out of the recording medium 18 (the decoding includes decompression of compressed data). The readout operation is performed intermittently under the control of the control unit 16.

The buffer memory 20 temporarily stores music data decoded by the decoding unit 19. The buffer memory 20 absorbs a delay in music data in the operation of reading data from the recording medium 18 and the operation of decoding the data. The music data once stored in the buffer memory 20 is transferred to the D/A converting unit 21 at a constant data transfer rate that is necessary for playing back the music data.

The D/A converting unit 21 converts music data output from the buffer memory 20 from digital data to an analog signal.

The speaker 22 converts the analog signal output from the D/A converting unit 21 into an audible sound wave and outputs it. The speaker 22 corresponds to an internal speaker or an externally connected headphone.

(First Embodiment)

The music playback apparatus according to the first embodiment of the present invention will now be described.

Figure 3:
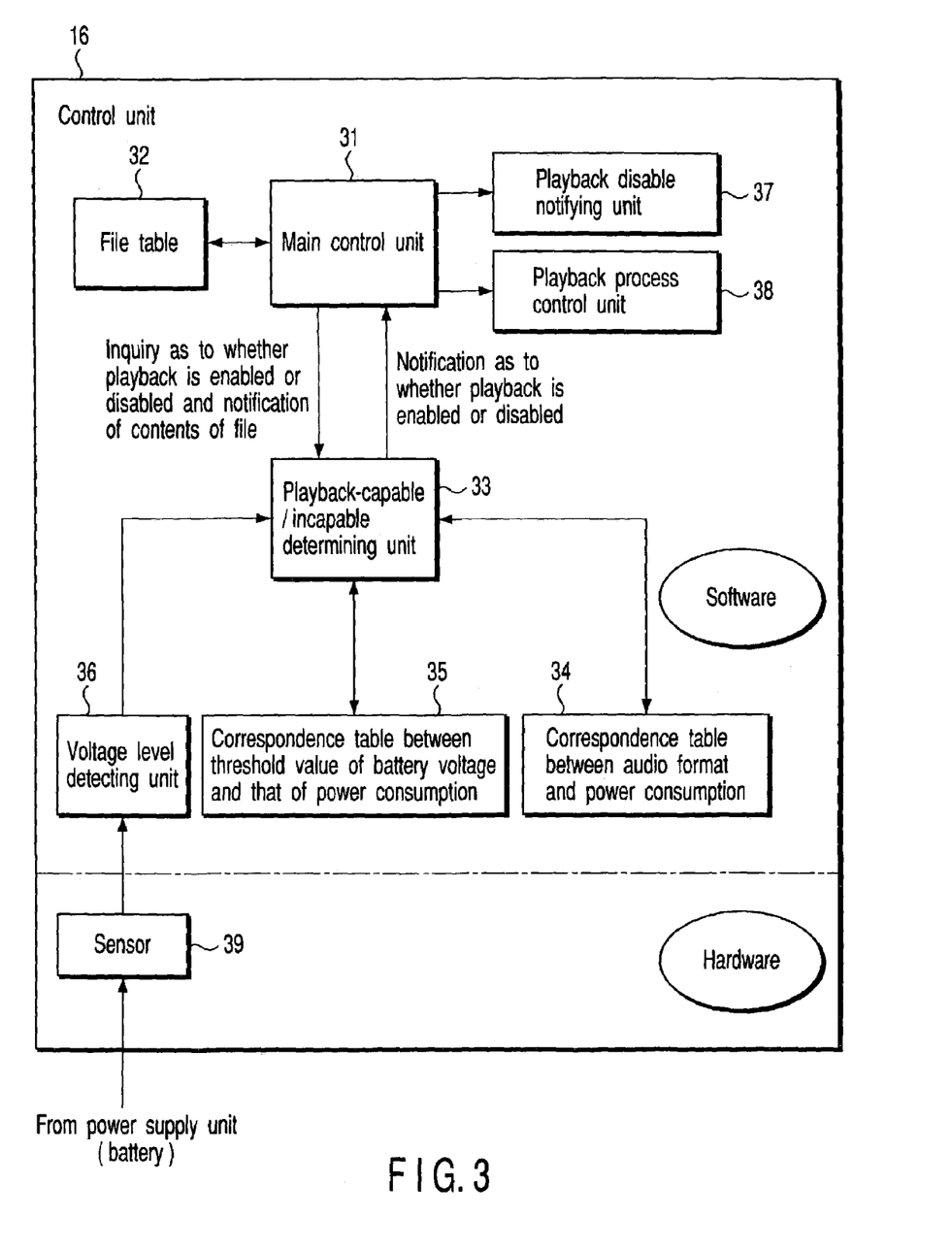
FIG. 3 is a block diagram illustrating functions of a control unit of the apparatus according to the first embodiment of the present invention.

FIG. 3 is a block diagram illustrating functions of the control unit 16 of the apparatus according to the first embodiment.

The control unit 16 includes a main control unit 31 realized as software, a file table 32, a playback-capable/incapable determining unit 33, an audio format/power consumption correspondence table 34, a battery voltage threshold value/power consumption threshold value correspondence table 35, a voltage level detecting unit 36, a playback-incapable notifying unit 37, a playback process control unit 38 and a sensor 39 realized as hardware.

The main control unit 31 has a function of notifying the playback-capable/incapable determining unit 33 of the contents (the type of audio format for use) indicated in the file table 32 and inquiring of the unit 33 whether a playback can be performed or not when the music playback apparatus is put into playback mode.

Upon receiving a notification about playback-capability/incapability of music for each audio format from the playback-capable/incapable determining unit 33, the main control unit 31 instructs the playback-incapable notifying unit 37 to make a notification about an unusable audio format and instructs the playback process control unit 38 to control a playback process in a usable audio format.

The file table 32 holds information (e.g., the type of audio format and the number and playing time of each piece of music) about music data recorded on the recording medium 18. This information is referred to by the main control unit 31 or the playback-capable/incapable determining unit 33.

The playback-capable/incapable determining unit 33 forms on the table 34 information about a correspondence between an audio format and power consumption based on the contents of the file table 32 notified by the main control unit 31.

The unit 33 has a function of determining which audio format requires power consumption whose amount exceeds a given value, with reference to the tables 34 and 35, when the voltage level of the battery detected by the voltage level detecting unit 36 is lower than the threshold value and then notifying the main control unit 31 of the determination result.

Figure 4:
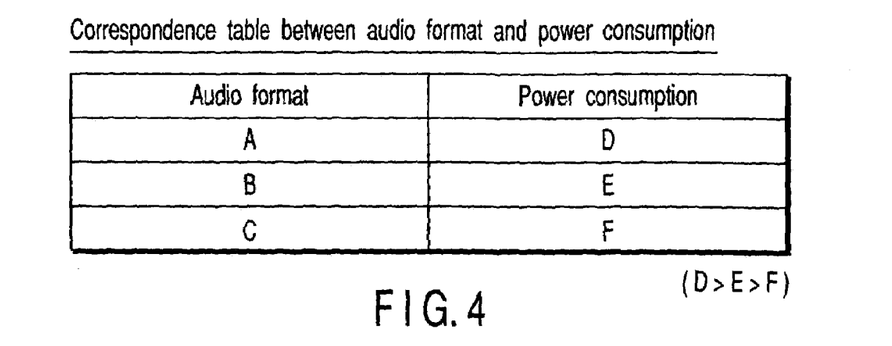
FIG. 4 is a table showing a correspondence between an audio format and power consumption in the apparatus according to the first embodiment of the present invention.

Referring to FIG. 4, the correspondence table 34 shows a correspondence between a plurality of audio formats A to C used in the present apparatus and values D to F (D>E>F) of power consumption obtained when music is played back in each of the audio formats. For example, the audio formats A to C include MP3, WMA, AAC (each using a speech compression technique) and PCM (not using a speech compression technique).

Figure 5:
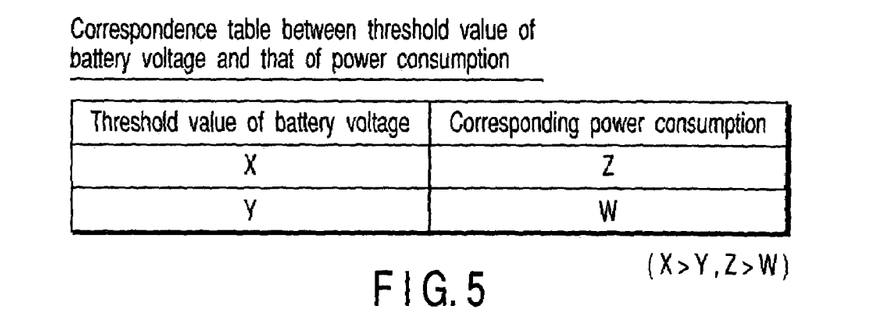
FIG. 5 is a table showing a correspondence between a threshold value of battery voltage and that of power consumption in the apparatus according to the first embodiment of the present invention.

Referring to FIG. 5, the correspondence table 35 shows a correspondence between threshold values X and Y (X>Y) of a plurality of (two) battery voltages that are preset as an index of reduction in the remaining amount of charge of the battery and values Z and W (Z>W) of power consumption that correspond to the threshold values. In this case, the values Z and W are set so as to satisfy the following relation: D>Z>E>W>F.

The voltage level detecting unit 36 detects a voltage level based on the detection result received from the sensor 39 and sends data indicative of the voltage level to the playback-capable/incapable determining unit 33.

The playback-incapable notifying unit 37 makes a notification about an audio format incapable of playback in response to an instruction from the main control unit 31. This notification can be displayed through the display unit 12 shown in FIG. 1 or by voice through the speaker 13 concurrently with the display.

The playback process control unit 38 controls a playback process in audio format capable of playback in response to an instruction from the main control unit 31. The unit 38 does not play back music in the audio format incapable of playback but skips it and sequentially plays back only the music in the audio format capable of playback.

The sensor 39 senses the remaining amount of charge (voltage level) of the battery of the power supply unit 17 and sends the sensing result to the voltage level detecting unit 36.

Figure 6:
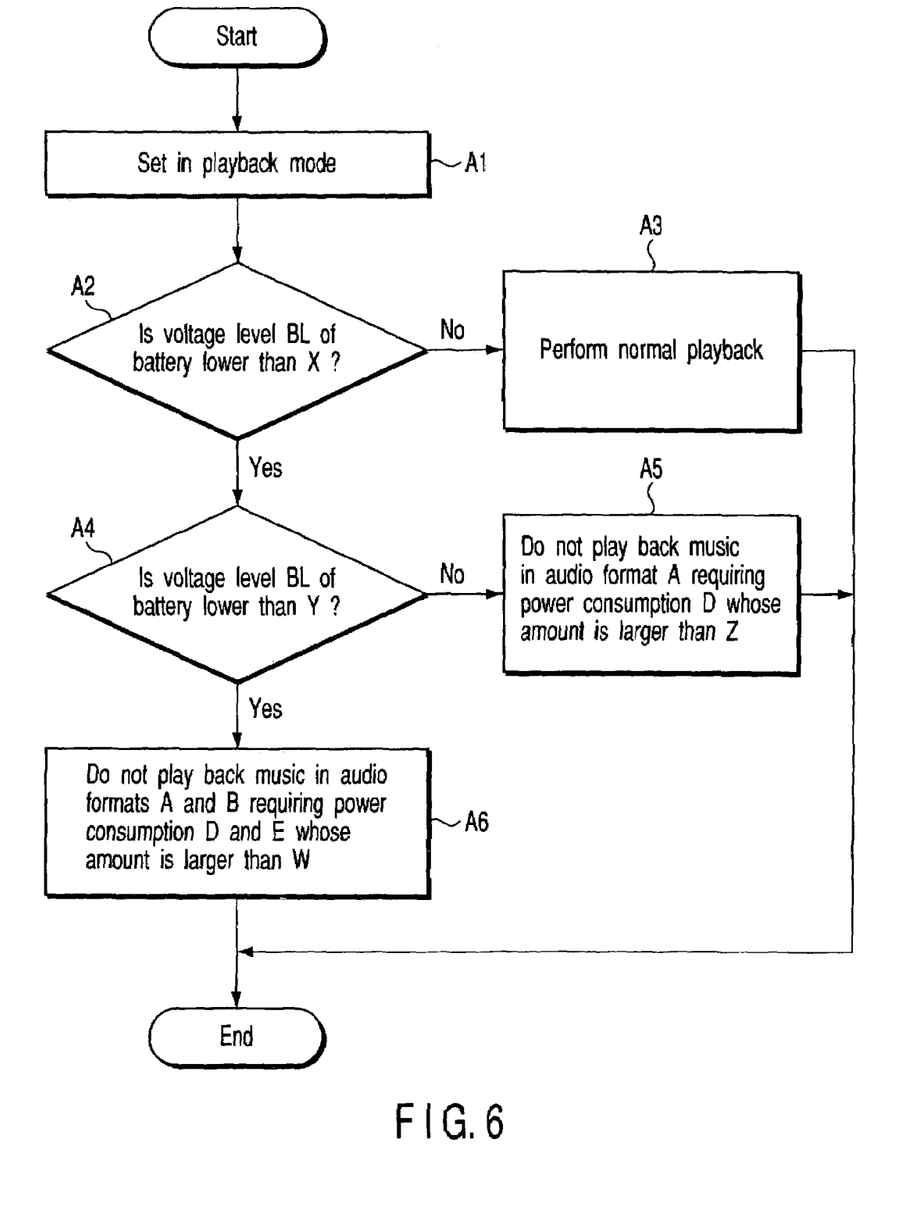
FIG. 6 is a flowchart illustrating a power-saving control operation of the apparatus according to the first embodiment of the present invention.

A power-saving control operation of the apparatus according to the first embodiment will now be described with reference to FIG. 6.

When the control unit 16 detects that the playback apparatus is set in playback mode in accordance with user's operation (step A1), it starts power-saving control corresponding to the voltage of the battery.

First, the control unit 16 determines whether the voltage level BL of the battery is lower than a first threshold value X (step A2).

If the control unit 16 determines that the voltage level BL is not lower than the first threshold value X in step A2, a normal playback is performed (step A3). On the other hand, if the voltage level BL is lower than the value X, the flow advances to the next determination process (step A4). In other words, the control unit 16 determines whether the voltage level BL of the battery is lower than a second threshold value Y (step A4).

If the control unit 16 determines that the voltage level BL is not lower than the second threshold value Y in step A4, the voltage level BL is expressed as follows: X>BL>Y (the remaining amount of charge of the battery is small). Referring to each of the tables shown in FIGS. 4 and 5, the control unit 16 determines that music in audio format A, which requires a larger amount of power consumption D than that of power consumption having a threshold value Z corresponding to the threshold value X of battery voltage, is not played back and performs control to play back music in audio format other than the audio format A (step A5).

If the control unit 16 determines that the voltage level BL is lower than the second threshold value Y in step A4, the voltage level BL is expressed as follows: BL<Y (the remaining amount of charge of the battery is very small). Referring to each of the tables shown in FIGS. 4 and 5, the control unit 16 determines that music in audio formats A and B, which requires a larger amount of power consumptions D and E than that of power consumption having a threshold value W corresponding to the threshold value Y of battery voltage, is not played back and performs control to play back music in audio format other than the audio formats A and B (step A6).

According to the first embodiment described above, when the remaining amount of charge of a battery is decreased, the control unit 16 restricts the playback of music in audio format having a large amount of power consumption in consideration of a difference in power consumption among audio formats. Thus, a playback can be stabilized when the remaining amount of charge of the battery is decreased and an available time of the battery can be lengthened. Since, moreover, a plurality of threshold voltages of the battery are set, the power-saving control can be performed more finely and flexibly.

(Second Embodiment)

The music playback apparatus according to the second embodiment of the present invention will now be described.

Figure 7:
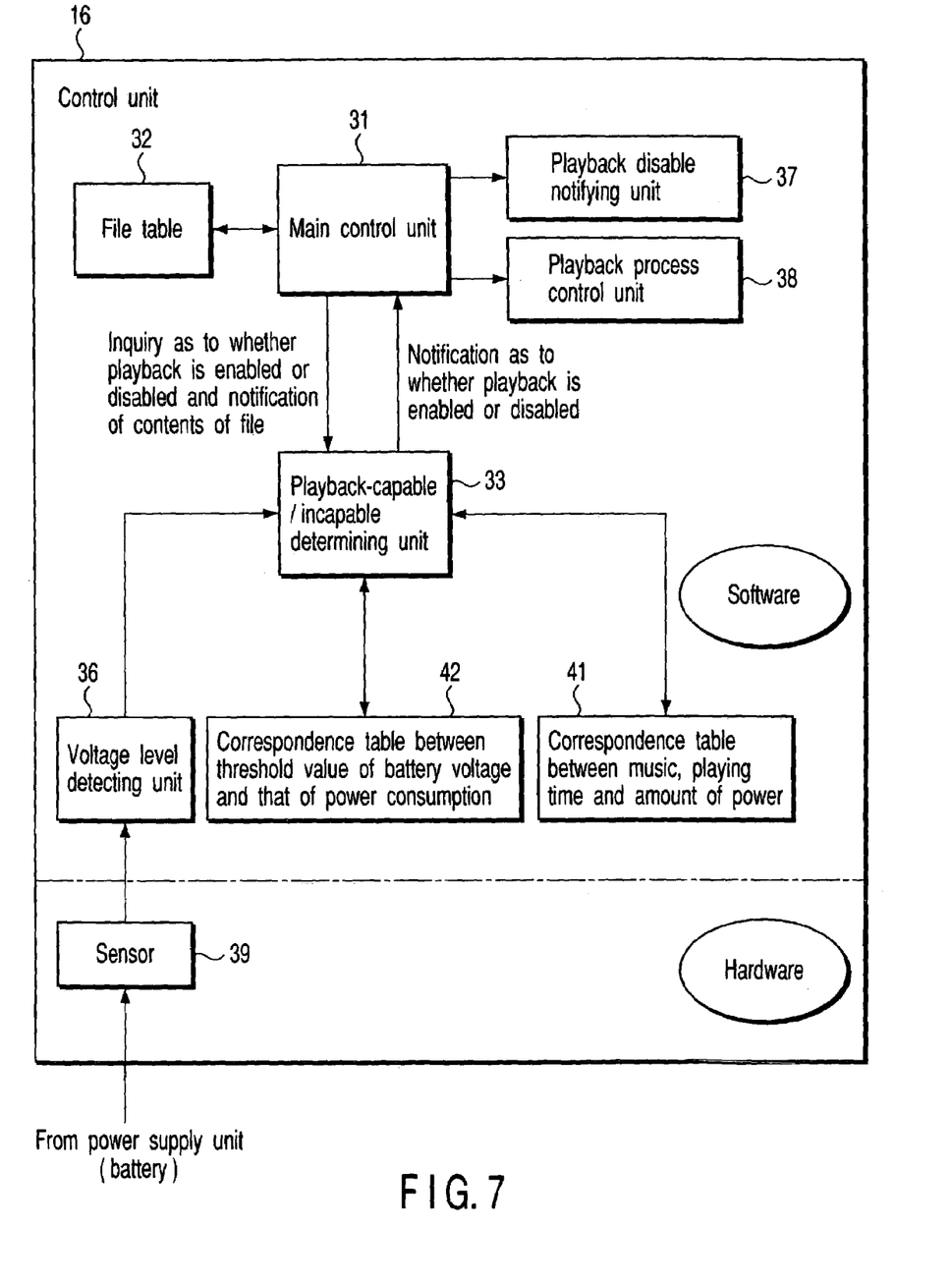
FIG. 7 is a block diagram illustrating functions of a control unit of the apparatus according to the second embodiment of the present invention.

FIG. 7 is a block diagram illustrating functions of the control unit 16 of the apparatus according to the second embodiment of the present invention. The components common to those of the foregoing first embodiment (shown in FIG. 3) are denoted by the same reference numerals.

The components different from those of the first embodiment (shown in FIG. 3) are a music/playing time/power amount correspondence table 41 and a battery voltage threshold value/power amount threshold value correspondence table 42.

In the second embodiment, the main control unit 31 has a function of notifying the playback-capable/incapable determining unit 33 of the contents (e.g., audio format and number, playing time and playing order of music to be played back) shown in the file table 32 and inquiring of the unit 33 whether a playback can be performed or not when the present apparatus is put into playback mode. Upon receiving a notification about playback-capability/incapability of each piece of music from the playback-capable/incapable determining unit 33, the main control unit 31 instructs the playback-incapable notifying unit 37 to make a notification about music incapable of playback and instructs the playback process control unit 38 to control a playback process for music capable of playback.

The playback-capable/incapable determining unit 33 forms on the table 41 information indicative of a correspondence between music, playing time and amount of power based on the contents of the file table 32 notified by the main control unit 31. In this case, an amount of power of each piece of music is calculated by the following equation:

(amount of power of music)=(power of audio format)×(playing time)

When a recording medium is changed or music data is added, an amount of power of new music is calculated appropriately and reflected on the table 41. The calculation of the amount of power of music can be performed by a unit other than the playback-capable/incapable determining unit 33.

The unit 33 has a function of determining which music requires an amount of power exceeding a given value, with reference to the tables 41 and 42, when the voltage level of the battery detected by the voltage level detecting unit 36 is lower than the threshold value and then notifying the main control unit 31 of the determination result.

Figure 8:
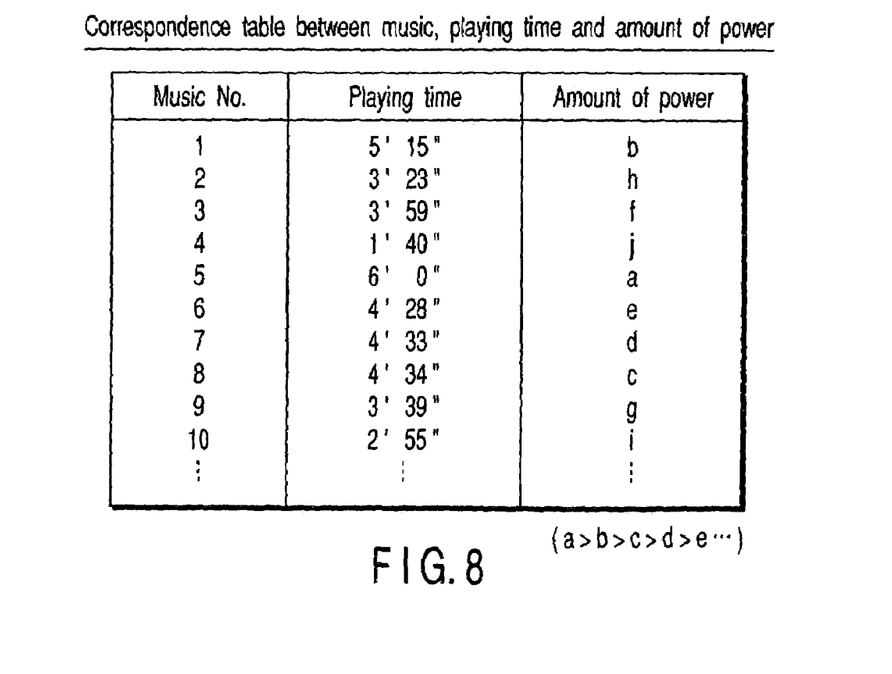
FIG. 8 is a table showing a correspondence between music, playing time and amount of power in the apparatus according to the second embodiment of the present invention.

Referring to FIG. 8, the correspondence table 41 shows a correspondence between the numbers 1, 2, 3, 4, 5, . . . of music pieces to be played back in the present apparatus, the playing time of each of the music pieces and the amounts b, h, f, j, a, . . . (a >b>c>d>e . . . ) of power used when the music pieces are played back.

Figure 9:
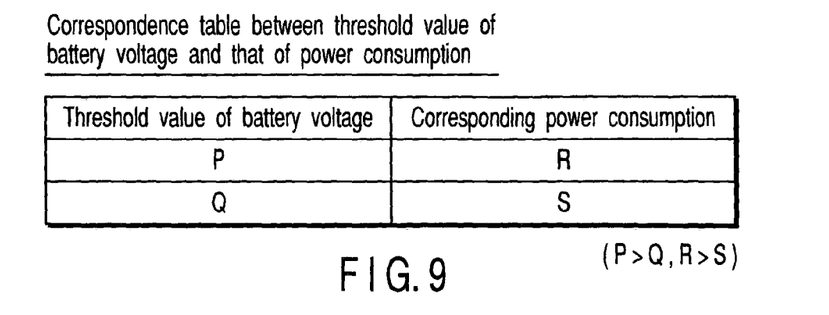
FIG. 9 is a table showing a correspondence between a threshold value of battery voltage and that of power consumption in the apparatus according to the second embodiment of the present invention.

Referring to FIG. 9, the correspondence table 42 shows a correspondence between threshold values P and Q (P>Q) of a plurality of (two) battery voltages that are preset as an index of reduction in the remaining amount of charge of the battery and amounts R and S (R>S) of power that correspond to the threshold values. In this case, the amounts R and S of power are set so as to satisfy the following relation: a>R>b>S>c.

As in the first embodiment, the voltage level detecting unit 36 detects a voltage level based on the result of detection received from the sensor 39 and sends data indicative of the voltage level to the playback-capable/incapable determining unit 33.

The playback-incapable notifying unit 37 makes a notification about music incapable of playback in response to an instruction from the main control unit 31. This notification can be displayed through the display unit 12 shown in FIG. 1 or by voice through the speaker 13 concurrently with the display.

The playback process control unit 38 controls a playback process of music capable of playback in response to an instruction from the main control unit 31. In this case, the unit 38 does not play back music incapable of playback but skips it and sequentially plays back only the music capable of playback.

As in the first embodiment, the sensor 39 senses the remaining amount of charge (voltage level) of the battery of the power supply unit 17 and sends the sensing result to the voltage level detecting unit 36.

Figure 10:
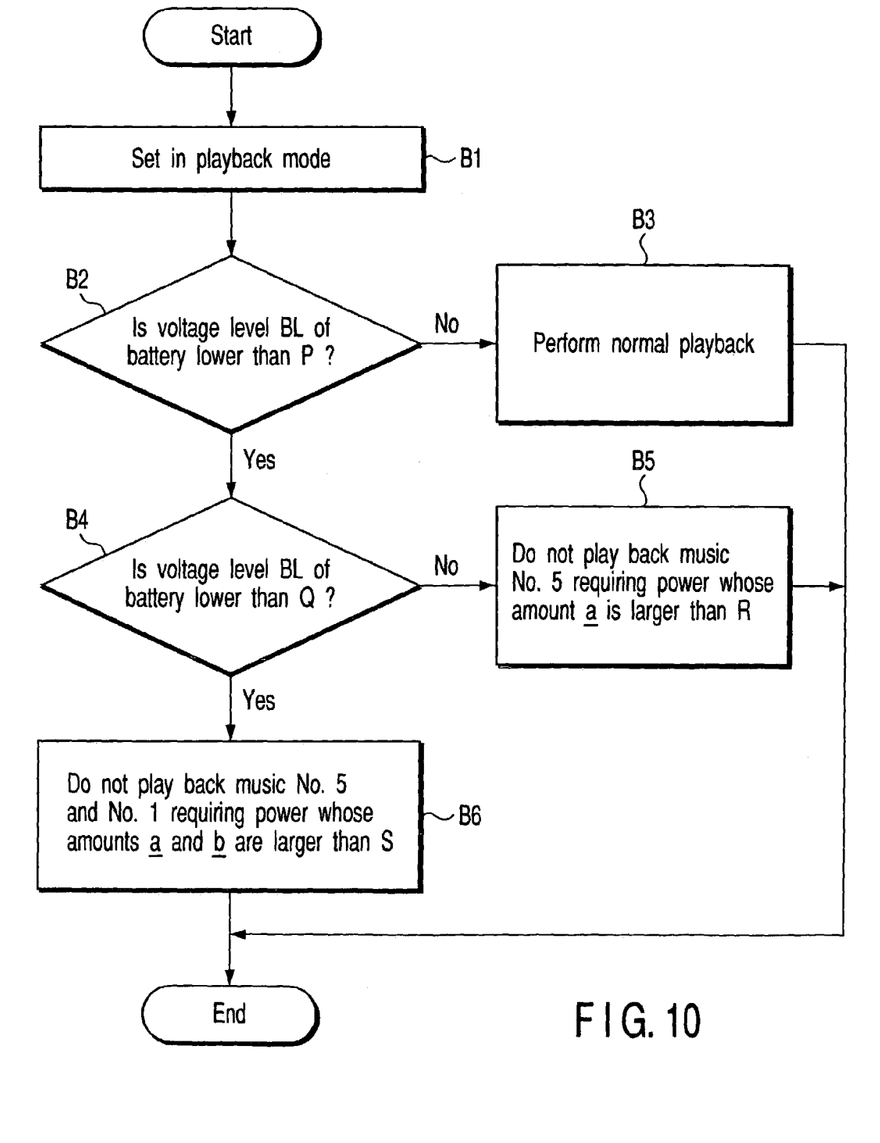
FIG. 10 is a flowchart illustrating a power-saving control operation of the apparatus according to the second embodiment of the present invention.

A power-saving control operation of the apparatus according to the second embodiment will now be described with reference to FIG. 10.

When the control unit 16 detects that the playback apparatus is put into playback mode in accordance with user's operation (step B1), it starts power-saving control based on the voltage of the battery.

First, the control unit 16 determines whether the voltage level BL of the battery is lower than a first threshold value P (step B2).

If the control unit 16 determines that the voltage level BL is not lower than the first threshold value P in step B2, a normal playback is performed (step B3). On the other hand, if the voltage level BL is lower than the value P, the flow advances to the next determination process (step B4). In other words, the control unit 16 determines whether the voltage level BL of the battery is lower than a second threshold value Q (step B4).

If the control unit 16 determines that the voltage level BL is not lower than the second threshold value Q in step B4, the voltage level BL is expressed as follows: P>BL>Q (the remaining amount of charge of the battery is small). Referring to each of the tables shown in FIGS. 9 and 8, the control unit 16 determines that music of No. 5, which requires a larger amount a of power than that of power having a threshold value R corresponding to the threshold value P of battery voltage, is not played back and performs control to play back music other than the music of No. 5 (step B5).

If the control unit 16 determines that the voltage level BL is lower than the second threshold value Q in step B4, the voltage level BL is expressed as follows: BL<Q (the remaining amount of charge of the battery is very small). Referring to each of the tables shown in FIGS. 9 and 8, the control unit 16 determines that music of Nos. 5 and 1, which requires larger amounts a and b of power than that of power having a threshold value S corresponding to the threshold value Q of battery voltage, is not played back and performs control to play back music other than the music of Nos. 5 and 1 (step B6).

According to the second embodiment, when the remaining amount of charge of a battery is decreased, the control unit 16 restricts the playback of music requiring a large amount of power in consideration of a difference in amount of power among music pieces. Thus, a playback can be stabilized when the remaining amount of charge of the battery is decreased and an available time of the battery can be lengthened. Since, moreover, a plurality of threshold voltages of the battery are set, the power-saving control can be performed more finely and flexibly.

The present invention is not limited to the forgoing embodiments. For example, the power-saving control of the first embodiment and that of the second embodiment can be combined with each other.

According to the playback apparatus of the present invention described above, the battery can be prevented from being exhausted in a very short time and a longer playing time can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A playback apparatus which plays back music in a plurality of audio formats, the apparatus comprising:
   a voltage level detecting unit configured to detect a voltage level of a battery;
   a control unit configured to restrict a playback of music in one of the plurality of audio formats, which requires power consumption whose amount exceeds a given value, when the voltage level detected by the voltage level detecting unit is lower than a threshold value;
   a first storage unit configured to store first information indicating a correspondence between the plurality of audio formats and power consumption; and
   a second storage unit configured to store second information indicating a correspondence between a threshold value of the voltage level and a threshold value of the power consumption,
   wherein the control unit determines an audio format which is to restrict a playback of music using the first information and the second information.

2. The playback apparatus according to claim 1 wherein the second information indicates a plurality of correspondences having different threshold values.

3. The playback apparatus which plays back music in a plurality of audio formats, the apparatus comprising:
   a voltage level detecting unit configured to detect a voltage level of a battery;

a control unit configured to restrict a playback of music in one of the plurality of audio formats, which requires power consumption whose amount exceeds a given value, when the voltage level detected by the voltage level detecting unit is lower than a threshold value;

means for storing first information indicating a correspondence between the plurality of audio formats and power consumption; and means for storing second information indicating a correspondence between a threshold value of the voltage level and a threshold value of the power consumption, wherein the control unit includes means for determining an audio format which is to restrict a playback of music using the first information and the second information.

4. The playback apparatus according to claim 3 wherein the second information indicates a plurality of correspondences having different threshold values.

5. A playback apparatus which plays back a plurality of pieces of music, the apparatus comprising:

a voltage level detecting unit configured to detect a voltage level of a battery;

a control unit configured to restrict a playback of one of the plurality of pieces of music, which requires power whose amount exceeds a given value when the voltage level detected by the voltage level detecting unit is lower than a threshold value;

a first storage unit configured to store first information indicating a correspondence between the plurality of pieces of music and an amount of power; and a second storage unit configured to store second information indicating a correspondence between a threshold value of the voltage level and a threshold value of the amount of power, wherein the control unit determines a piece of music whose playback is to be restricted using the first information and the second information.

6. The playback apparatus according to claim 5 wherein the control unit calculates an amount of power of each of the plurality of pieces of music from playing time of each of the plurality of pieces of music.

7. The playback apparatus according to claim 5 wherein the second information indicates a plurality of correspondences having different threshold values.

8. A playback apparatus which plays back a plurality of pieces of music, the apparatus comprising:

a voltage level detecting unit configured to detect a voltage level of a battery;

a control unit configured to restrict a playback of one of the plurality of pieces of music, which requires power whose amount exceeds a given value, when the voltage level detected by the voltage level detecting unit is lower than a threshold value;

means for storing first information indicating a correspondence between the plurality of pieces of music and an amount of power; and means for storing second information indicating a correspondence between a threshold value of the voltage level and a threshold value of the amount of power, wherein the control unit includes means for determining a piece of music whose playback is to be restricted using the first information and the second information.

9. The playback apparatus according to claim 8 wherein the control unit includes means for calculating an amount of power of each of the plurality of pieces of music from playing time of each of the plurality of pieces of music.

10. The playback apparatus according to claim 8 wherein the second information indicates a plurality of correspondences having different threshold values.

\* \* \* \* \*